US 7,797,484 B2

(12) United States Patent
Bedi et al.

(10) Patent No.: US 7,797,484 B2
(45) Date of Patent: Sep. 14, 2010

(54) MANAGING ACCESS TO DISK STORAGE

(75) Inventors: Bharat Veer Bedi, Portsmouth (GB);
Marc Stanley Carter, London (GB);
Iain David Lewis, Southampton (GB);
Lucas William Partridge, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 562 days.

(21) Appl. No.: 11/551,039

(22) Filed: Oct. 19, 2006

(65) Prior Publication Data

US 2007/0124547 A1 May 31, 2007

(30) Foreign Application Priority Data

Nov. 29, 2005  (GB) ................... 0524260.7

(51) Int. Cl.
*G06F 12/00* (2006.01)
(52) U.S. Cl. .................. 711/112; 711/117; 711/147; 711/165; 711/E12.016; 718/101
(58) Field of Classification Search ........................ None
See application file for complete search history.

(56) References Cited

U.S. PATENT DOCUMENTS

| 6,078,998 | A | 6/2000 | Kamel et al. |
| 6,182,197 | B1 | 1/2001 | Dias et al. |
| 6,205,527 | B1 * | 3/2001 | Goshey et al. ............... 711/162 |
| 6,654,752 | B2 * | 11/2003 | Ofek ............................ 707/10 |
| 6,823,511 | B1 * | 11/2004 | McKenney et al. ......... 718/102 |
| 2002/0143847 | A1 | 10/2002 | Smith |
| 2005/0283575 | A1 * | 12/2005 | Kobayashi et al. .......... 711/147 |

FOREIGN PATENT DOCUMENTS

EP    1193967 A2    3/2002

* cited by examiner

*Primary Examiner*—Reginald G Bragdon
*Assistant Examiner*—Shawn X Gu
(74) *Attorney, Agent, or Firm*—Robert H. Frantz; David A. Mims, Jr.

(57) ABSTRACT

A file access manager for scheduling of read/write operations and disk I/O operations for files that must be retrieved from disk storage. The file access manager schedules the operations such that a single file retrieval from disk is required for a plurality of processes to operate on the file. If any of the processes write to the file, a single disk write operation is then performed.

10 Claims, 3 Drawing Sheets

MANAGING ACCESS TO DISK STORAGE

FIELD OF INVENTION

The present invention relates to managing access to storage within data processing systems, for improved system performance.

BACKGROUND

In a typical data processing system, a number of software tools require regular access to disk storage and other auxiliary storage. In addition to input and output operations (storage I/O operations) directly resulting from a system user's interaction with an application program, disk access is required for utilities such as indexing, taking a backup to offline storage, and archiving with data movement and compaction. Disk access is also required for periodically-executing applications such as virus scanning and spyware detection.

The tools performing each of these file-level operations are typically unaware of the other tools, even when they run in parallel. In currently available personal computers, any disk I/O operation is a relatively slow operation—because of the requirement for physical movement of a read/write element relative to the disk. When two or more of these tools perform batch processing of a large number of files, their repeated requirements for disk access can lead to very slow system performance. This is problematic when the tools run in parallel and compete for resources, but is also problematic when one batch processing utility is followed by another batch processing utility because slow system performance can then continue for an unacceptably long period of time.

A lot of work has been done on scheduling of disk access operations. For example, US Patent Application Publication No. 2002/0143847 describes a method of scheduling for a mixed-priority workload—comprising high—priority online transaction processing operations and lower-priority monitoring operations. US 2002/0143847 describes issues affecting response times, such as conflicts between requests and parallel queries across multiple storage volumes. The dispatch of processes servicing a low priority workload is deferred, and low priority I/O operations are not performed, to ensure that high priority workload items are not deferred beyond acceptable response time bounds.

European Patent Application Publication Number EP 1193967 also describes a disk scheduling algorithm for a mixed-priority workload.

Requests held in queues are reorganized when a new request arrives such that a low priority request is only serviced if this can be done without violating the deadline constraints of a higher priority request.

U.S. Pat. No. 6,078,998 is another patent specification describing scheduling with reference to deadlines and priorities, in this case aiming to improve disk utilization and efficiency for a data-intensive application such as a multimedia application by calculating a global optimization of seek time.

U.S. Pat. No. 6,182,197 describes ordering data access requests for shared disk data based on priorities, and re-ordering requests in response to updated priorities.

Each of the above-identified patent specifications describes an attempt to handle different priorities of requests for particular types of process. However, known attempts at scheduling disk access operations have focussed on optimizing the order in which to perform the separate tasks, without any attempt to reduce the number of separate disk access operations.

SUMMARY

Various aspects of the present invention provide a file access manager, a method for scheduling read/write operations for a plurality of processes, and a data processing apparatus for implementing the method. The method comprises: identifying a plurality of processes that each independently require storage I/O operations for a particular file held in data storage; retrieving the particular file from the data storage; and performing read/write operations on the retrieved file for at least two of the plurality of processes, before saving the results to storage.

The plurality of processes may be independent computer program-implemented processes that require file system access, such as utility programs and application programs that can execute periodically as background tasks without user intervention. The invention is particularly well-suited to managing coordinated file access for processes that automate batch processing—serially accessing many files. Such processes typically perform relatively short-duration operations for any one file—and so require each file to be held in system memory for a relatively short period of time compared with a typical user-controlled interactive application program. Exemplary utilities for which the invention is applicable include computer programs for indexing file contents (for example within a desktop search tool), for backup, for archiving, or for software checkpointing. Exemplary application programs include virus scanning and spyware detection.

In one embodiment, the step of identifying a plurality of processes that require storage I/O operations for a particular file comprises identifying concurrently pending I/O requests from the plurality of processes, which I/O requests are associated with read/write operations to be performed on the particular file. Two or more read/write operations are then performed on the file following a single retrieval of the file from disk, and are followed by a single write to disk. The method and file access manager can reduce the total number of storage access operations, since a particular data file can be retrieved once in a particular period of time for processing by N processes, instead of being retrieved N times.

In another embodiment, the identifying step comprises identifying a plurality of processes that execute periodically and which perform read or write operations on a particular file. Control over the scheduling of I/O operations is delegated to the file access manager and is based on information provided when each process registers with the file access manager (instead of always being responsive to concurrently pending read/write requests). A file access manager and method can schedule I/O operations such that the operation of retrieving the particular file is performed at an appropriate time to satisfy the requirements of two or more processes. A plurality of read/write operations are then performed on the retrieved file by the two or more processes—without requiring a plurality of retrieval operations, and with only a single disk write operation even if multiple write operations were performed.

The file access manager may be invoked immediately in response to receipt of a file request, or on a scheduled basis, or when CPU utilization is below a threshold.

The concurrent-request scheduling and longer-term scheduling support of the above-described embodiments can both be implemented within a single file access manager tool. The invention can be implemented in association with conventional scheduling algorithms to take account of different priorities and deadlines, for optimized scheduling of I/O operations and read/write operations.

One embodiment of the invention implements a set of rules in which the actions and outcomes of certain processes influence whether other processes need to execute at all. For example, a first rule specifies that a file that fails a virus scan or is identified as a spyware file should not be backed up. As a second example, a file that does not need a repeat back-up operation also does not need re-indexing. Such rules complement the optimization of read/write operations described above.

The method and file access manager of the invention can thus determine a schedule for disk access operations and for parallel process execution that takes account of the current profile of processes being run and which can reduce the total number of disk access operations. If a single tool is run in isolation, a traditional disk access pattern can be selected according to the requirements of that tool, whereas different patterns can be selected when different sets of processes run concurrently.

The file access manager and method described above may be implemented in computer program code. A program product according to the invention comprises computer program code recorded on a recording medium or transmitted via a network. The computer program can be installed on a data processing apparatus to perform the method as described above.

The file access manager can be provided as a computer program tool that integrates with the plurality of processes—for example, as one of the tools within an integrated tools suite. The tools suite provider is able to ensure optimal cooperation between the tools. However, the file access manager could also be implemented within an operating system device driver or within a disk controller.

A further aspect of the invention provides a data processing apparatus comprising:

a data storage means;

a plurality of computer programs installed on the data processing apparatus, which plurality of programs each require storage I/O operations for files held in the data storage means; and a file access manager comprising program code for performing the method steps of:

identifying a plurality of processes that each independently require storage I/O operations for a particular file held in data storage;

retrieving the particular file from the data storage; and performing read/write operations on the retrieved file for at least two of the plurality of processes before saving the results to storage.

BRIEF DESCRIPTION OF DRAWINGS

Embodiments of the invention are described below in more detail, by way of example, with reference to the accompanying drawings in which.

DETAILED DESCRIPTION OF EMBODIMENTS

Architectural Overview

Figure 1:
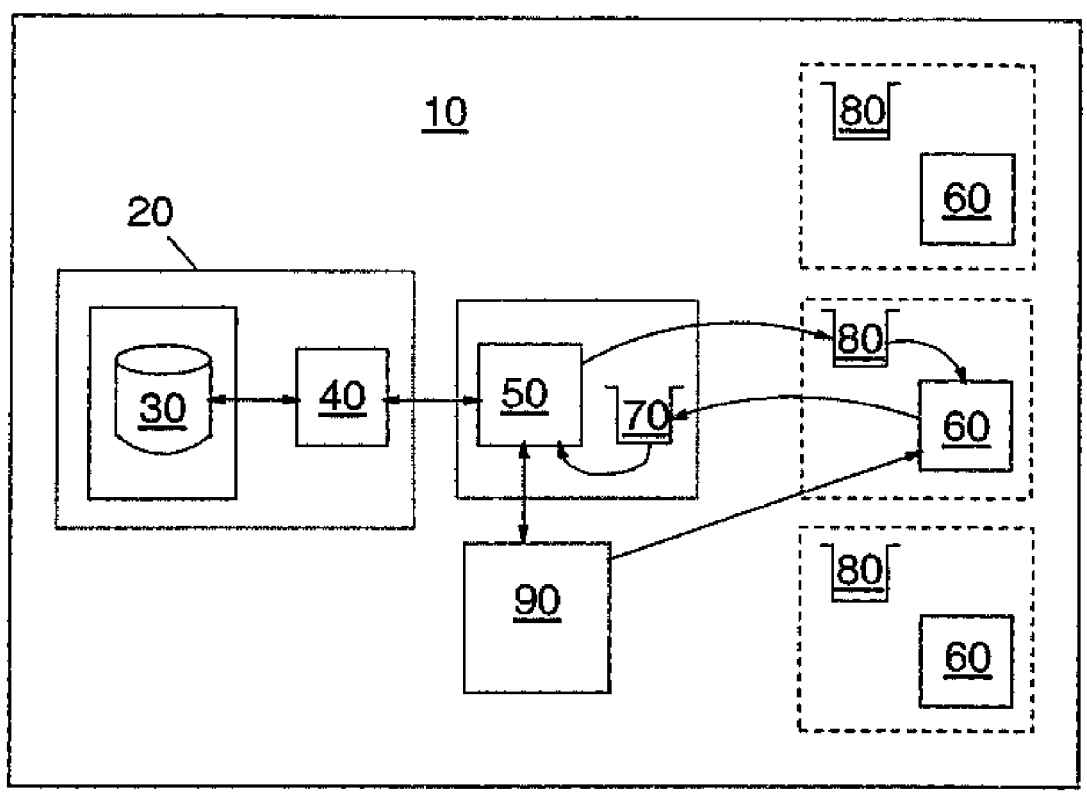
FIG. 1 is a schematic representation of a storage management architecture for a data processing system on which the present invention has been implemented.

FIG. 1 shows a storage management architecture within a data processing system 10. A storage subsystem 20 includes a number of physical disks 30 and a storage controller 40, as well as associated operating system device drivers, as is known in the art. In a first embodiment of the present invention, described in detail below, the conventional storage controller 40 interfaces with a file access manager 50 that is implemented as a disk proxy agent.

In other embodiments of the invention, the functions of the file access manager 50 are implemented as an integral component of the storage controller 40, or as integral features of the operating system. For ease of reference, the term 'file access manager' is used herein without differentiating between its implementation within a disk proxy agent program, within a disk controller 40 or within an operating system device driver.

In the first embodiment of the invention, the disk proxy agent 50 coordinates file access operations on behalf of a number of registered heterogeneous processes comprising utilities and application programs (commonly referred to below as 'utilities' 60 for ease of reference). It is possible for many processes to be running in the system without being registered with the disk proxy agent 50. Such unregistered processes communicate with the disk controller 40 in a conventional manner. However, the disk proxy agent 50 is unlikely to achieve optimized scheduling of read/write operations if only a minority of automated batch processing utilities register.

Although the example shown in FIG. 1 is an implementation of the invention on a single data processing system 10, the components shown in FIG. 1 could be distributed across more than one system. For example, the utilities 60 may be running on a number of different systems connected via a network to the system 10 running the disk proxy agent 50.

The disk proxy agent 50 and each registered utility 60 has a respective input queue 70, 80. These are used for asynchronous communications between the various components, as described below. A utility registers with the disk proxy agent 50 by placing a registration message onto the input queue 70 of the disk proxy agent 50. This message contains details of the type of utility, an identification of the file types that the utility is interested in, and an identification of the set of operations this utility is capable of performing (e.g. only read or read and write). The registration messages will differ for the different utilities. For example, a registration message for a backup process may specify all files under a specific directory (such as My Documents\*.*); whereas another utility may specify a requirement to access specific file types—such as all JAR files, *.exe files, and so on. An antivirus program usually requires read access to all executable file types (such as *.exe, *.doc, *.dll) and occasional write access when a problem is identified. An indexing file (such as Google Desktop) may wish to read any file that can contain text (*.TXT, *.DOC, *.WRI, *.LWP, *.HTML, etc). When the disk proxy agent 50 has received and processed a registration message, the agent sends an acknowledgement to the utility's respective input queue 80.

In a first embodiment described below, the information provided by utilities at registration time is sufficient for the disk proxy agent 50 to schedule I/O operations and read/write operations on retrieved files, and the registration messages can specify a maximum time between each execution of the utility.

In a second embodiment, also described below, some registrations with the disk proxy agent 50 specify only general requirements of each utility and are used by the proxy agent when the agent receives a specific file request. In the latter case, the disk proxy agent 50 checks whether it has received a plurality of concurrently-pending requests for the same file and performs a single retrieval of the file from disk to enable the plurality of concurrent requester utilities to perform read/write operations on the file.

Scheduling I/O Operations and Read/Write Operations for Registered Utilities

In the first embodiment, the utilities delegate responsibility for scheduling I/O operations to the disk proxy agent 50. The utilities can specify a maximum period between each execution of their program code, and the disk proxy agent determines a schedule for disk I/O operations and read/write operations that aims to satisfy the file access requirements and time requirements of all registered utilities.

For a simple example, let us assume that we have three utilities—U1 requiring execution at least once a day, U2 requiring execution at least weekly, and U3 requiring execution at least monthly. On most days, U1 runs alone and shared memory is not required. Once per week, the disk proxy agent coordinates file access for U1 and U2 using shared memory 90 for any files required by both utilities (as described in detail below). Once per month, the disk proxy agent coordinates file access for all three utilities.

At a scheduled time T (which could be, for example, midnight each night when a typical user will not be using their system), the disk proxy agent examines the set of registrations that it holds for registered utilities and generates a list of files comprising the union of files and file types from all these registrations. As a simple example, if a first utility U1 requires two files A and C and a second utility U2 requires files C and D, the union is {A,C,D}. Of course, A could represent either a single file or all files (*.*), or all files of a specific file type within a specific directory (such as My Documents\*.doc). This examination at time T is desirable because each utility could update its registration at any time.

In an alternative implementation, registration updates may again be applied to a list of required files as and when they occur, but the solution differs in that the disk proxy agent can be notified whenever new files are stored on disk. The disk proxy agent can notify utilities if the new file matches their registration information. In particular, the disk proxy agent can be given responsibility for processing new registrations, identifying changed files and new files, and for identifying changed registrations. In that case, if an accurate list can be maintained in memory to identify all files and to identify which files are currently of interest to registered utilities, there is no need to regenerate the union at time T. Such a list should not be limited to only the files currently required by registered utilities, since a new registration may require a previously-unrequired file.

The disk proxy agent 50 then instructs the disk controller 40 to retrieve the set of files {A,C,D}. For each retrieved file, the disk proxy agent refers to its stored registrations to determine which registered utilities require this file. On retrieval of file A (or one of the set of files represented by A), the disk proxy agent loads the file into an area of memory assigned for the private use of utility U1 because the disk proxy agent has determined that no other utility currently requires that file. Similarly, the disk proxy agent loads file D into private memory of utility U2. However, the disk proxy agent has determined that file C is required by both utilities U1 and U2, and loads this file (or set) into a shared area of memory so that each utility has access to the required file.

The order of processing of file C by utilities U1 and U2 can be random, but in the present embodiment is optimized according to the disk proxy agent's view of whether individual utilities are currently busy processing files. For example, if the information held by the disk proxy agent suggests that utility U1 is busy processing a file A when the file C is read into shared memory 90, the disk proxy agent initially notifies utility U2 of the availability of C in the shared memory. U2 responds by performing its processing on file C. Utility U1 subsequently notifies the disk proxy agent that U1 has completed processing file A (by placing a message on the input queue 70 of the disk proxy agent). Since no other utility requires file A, A can now be written back to disk. The disk proxy agent then notifies U1 that C is available in shared memory. U1 responds by processing C, and notifies the disk proxy agent when this is complete. When every utility that registered an interest in processing file C has notified the disk proxy agent that this processing is complete, the disk proxy agent can write file C back to disk.

The determination of which utilities are currently busy may be implemented in various ways by the disk proxy agent. For example, the agent may poll a utility to determine whether it is currently available to process a retrieved file. Alternatively, the utilities may send a message to the agent when they become available, and another message when they become unavailable. Thirdly, a utility may simply reject the processing of a file when the utility is busy with other processing.

This allocation of files to registered utilities can progress systematically through the disk, retrieving required files in the order in which they are stored on disk, or could be implemented by working systematically though a list of files regardless of their location on the disk. The former solution makes more efficient use of the storage subsystem.

Figure 2:
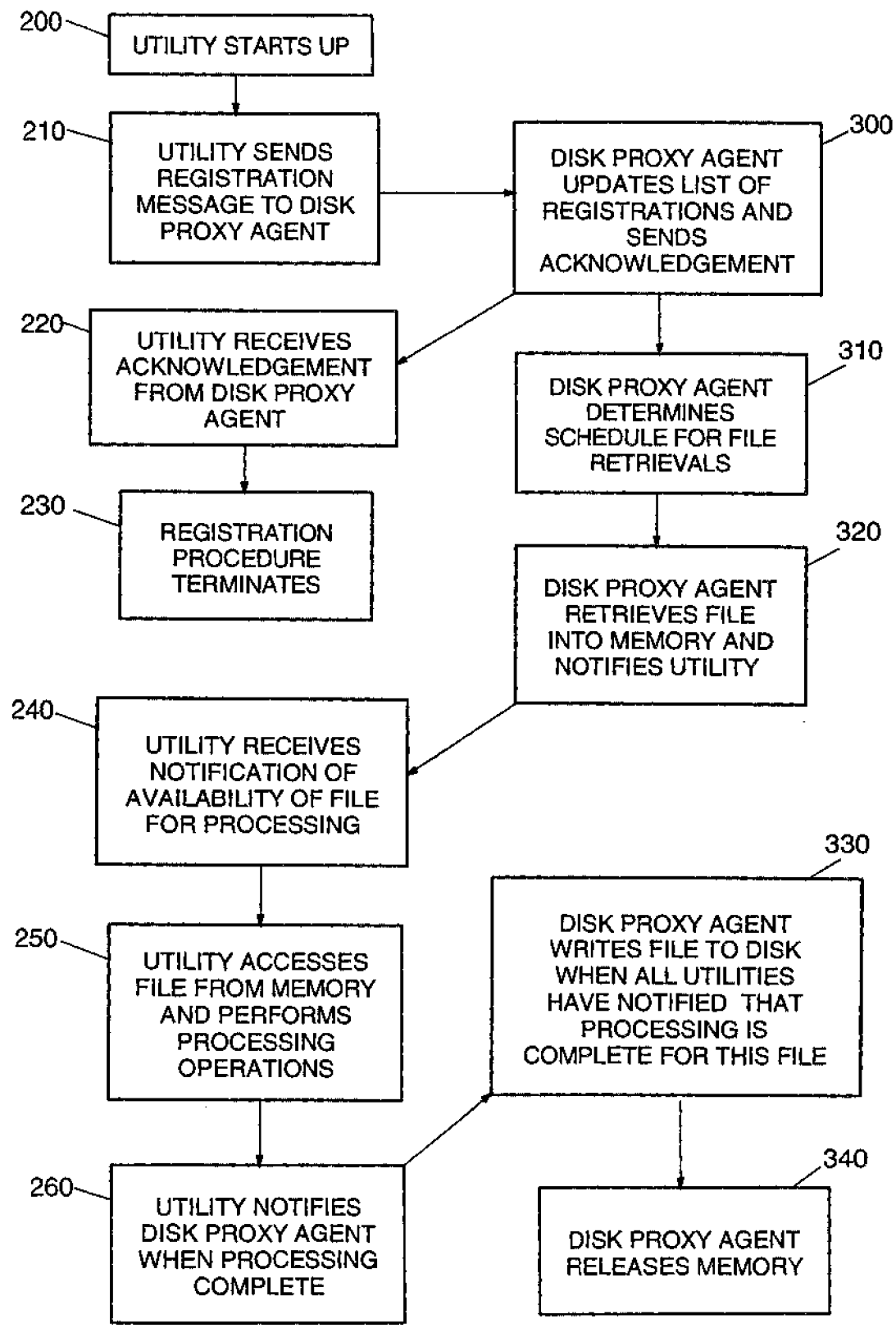
FIG. 2 is a schematic representation of the steps performed by a file access manager program and a utility program using the services of the file access manager, according to an embodiment of the invention.

The sequence of operations performed by a first utility 60 interacting with the disk proxy agent 50 is shown in FIG. 2. On startup 200, the utility 60 registers with the disk proxy agent 50 by placing 210 a message on the disk proxy agent's input queue 70, and then awaits receipt of an acknowledgement message. The registration procedure terminates 230 when a registration acknowledgement message is received 220 via the utility's input queue. The disk utility then enters its core loop. Each utility executes periodically in accordance with a schedule controlled by the disk proxy agent 50, since the utility does not send file access requests to the disk controller 40 but instead waits to be invoked by the disk proxy agent 50. When the utility receives 240 a notification from the disk proxy agent that one of its required files has been retrieved for processing and is available in memory, the utility accesses the file in memory and performs 250 its processing. On completion of its processing of the file, the utility 60 notifies 260 the disk proxy agent 50 that the file is no longer required.

FIG. 2 also shows an overview of the sequence of operations performed by the disk proxy agent. Logically, the operation of the disk proxy agent includes two concurrent execution flows (i.e. threads). The first flow responds to messages placed on the disk proxy agent's input queue 70. If the message is a registration message from a utility 60, the details are recorded 300 in an internal structure of the disk proxy agent. This includes the identification of file types that the utility is interested in. The registrations are used by the disk proxy agent to determine 310 an optimal schedule for disk I/O operations and for read/writes by the utilities. This first flow also handles a response message indicating that an identified utility has processed a certain file and no longer needs it. When the disk proxy agent determines that no utilities require the file, the disk proxy agent writes 330 the file back to disk (only necessary if one or more utilities performed a write operation for this file) and then frees 340 the area of shared memory 90 that was used by that file and discards any other resources being held for it.

Figure 3:
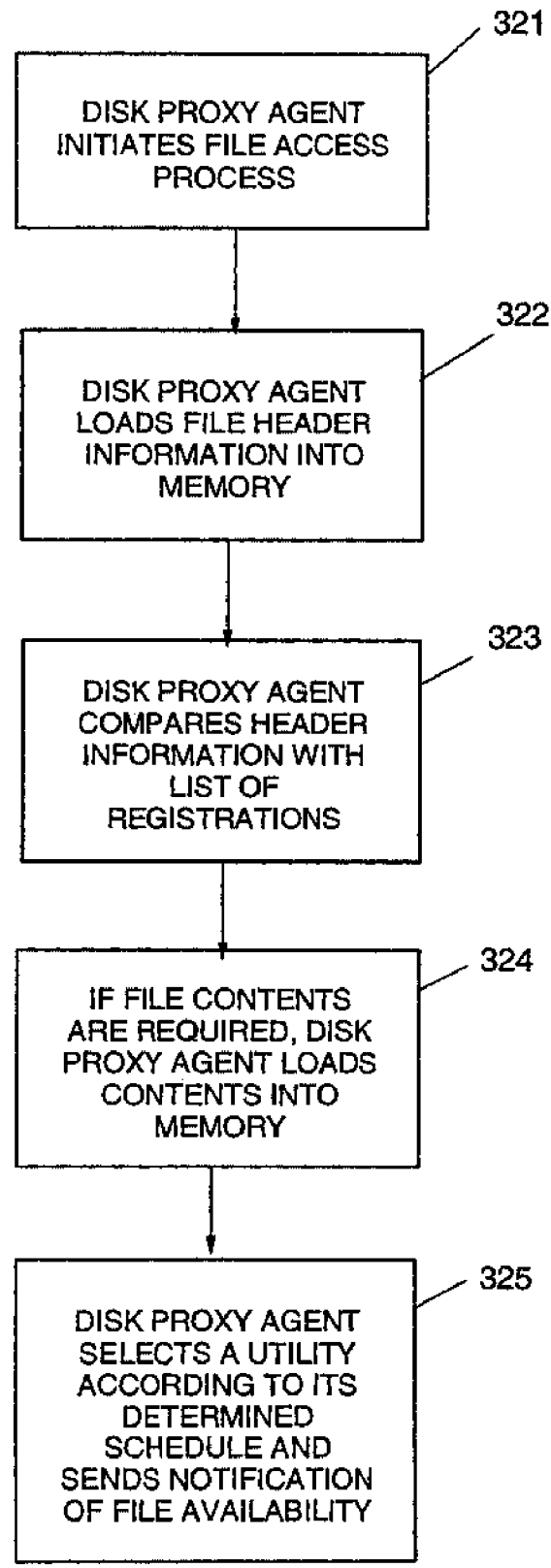
FIG. 3 is a more detailed representation of steps performed by the file access manager of FIG. 2, according to an embodiment of the invention.

The second flow is responsible for providing access to the disk on behalf of the utilities. This flow is shown in FIG. 3, and is represented by box 320 in FIG. 2. The second flow may be started 321 by the first flow (e.g. as an immediate response to a registration) or by some other external invocation (e.g. when a defined time period expires). The disk proxy agent initially loads 322 the 'header' data of a file into memory (i.e. information identifying the file type, file name, and other attributes required to determine what processing is required). When this header information has been loaded, the disk proxy agent performs 323 a comparison with a stored list of required file types obtained from registered utilities. If the file contents are required by only one utility, the file is read directly into memory private to that utility. If the file is required by more than one utility, the disk proxy agent will load 324 the file content into the shared memory 90 instead. This may require waiting for space to be freed at completion of current file operations. Having successfully loaded (or memory mapped for more efficiency) the file contents, the disk proxy agent places 325 the file header onto the input queue of a selected one of the disk utilities having corresponding requirements for files of this type. In another embodiment, a notification of file availability is sent to all utilities having a requirement for this file, and the first to respond is given file access.

The disk proxy agent keeps a record of the utilities using each file, to enable the disk proxy agent to determine when the file content can be discarded from shared memory.

Scheduling Read/Write Operations for Concurrent Requests

The disk proxy agent 50 responds to a file access request from a registered utility by prompting the disk controller 40 to retrieve the contents of the file. The disk proxy agent 50 also scans forwards through its input queue to identify other requests for the same file (i.e. which mention the file by name or which were placed in the queue by a utility that needs to perform an operation for all files of this type). If only one utility currently requires the file, the file contents are loaded into an area of memory that is privately assigned to the requester utility. However, if multiple utilities require the file contents, the disk proxy agent loads the contents into an area of shared memory 90 of the local system. The disk proxy agent then places a message on the respective input queue 80 of each of the utilities having concurrent requests outstanding for this file. These messages include header information for the retrieved file and indicate the availability of the file for processing.

A processing order can be determined in a number of different ways, as described above. In one embodiment of the invention, the first utility to respond to the availability message for a file is the first to be able to perform its read or write operations on that file. The first utility to respond may obtain a lock on the file (i.e. reads and writes from other utilities are prevented) while this processing is carried out. The lock is released in response to a notification from the first utility that it has completed its processing, and the file then becomes available for other utilities. Locks are not required for this file if no utilities have a requirement to write to this file.

Each utility that receives a message referencing the retrieved file performs a determination of whether the utility requires the content of this file. For example, whereas a virus scan requires the file contents, some other utilities may initially require only limited information for a file (for example, the file name, file location, byte length, timestamp, etc). A backup utility will be satisfied with such 'header' information alone if the backup utility determines from this header information that the file has not changed since the last backup. For each utility that requires the file contents, the contents are retrieved from the shared memory for processing. The utilities perform operations on the file header and/or file contents as required, and then place a response message onto the disk proxy agent's input queue to indicate that the utility has no further need for the file. It will be appreciated that multiple reads of an individual file can be performed by two or more utilities without conflict, whereas action has to be taken to avoid conflicts when multiple utilities require file access and at least one of these utilities requires performance of a content-modifying write operation. This avoidance action may be as simple as limiting to serial performance of any data-modifying write operations. For example, an archive operation (with data movement and compaction) can be performed after a set of read operations. Many solutions are known in the art for managing resource update contention.

When every utility that requested the file has informed the disk proxy agent 50 that the file is no longer needed, the disk proxy agent prompts the disk controller 40 to write the file back to disk if its contents have been modified.

Example Use Scenarios

Described below are a number of examples of the present invention in use.

In a first read-only scenario, five files A, B, C, D and E held in disk storage are of a file type which is of interest to one or more utilities 60 registered with the disk proxy agent 50. A first utility U1 has requested read access for each of files A and C, by placing request messages on the input queue of the disk proxy agent. A second utility U2 has requested read access to files C and D. The proxy agent processes its input queue and determines that file A is required by U1, C is required by U1 and U2 and D is required by U2. B and E are not currently required.

To enable the required operations to be performed on the required files, A is read from disk storage into a private area of memory for processing by utility U1, and D is read into private memory of U2. Since file C is required by a plurality of utilities, C is read from disk into shared memory 90. The disk proxy agent notifies each of U1 and U2 of the availability of C by placing a message in their respective input queues. Both of U1 and U2 can then read file C and perform their processing operations in parallel. Each of U1 and U2 notify the disk proxy agent 50 when they have read file C and they no longer require this file to be held in shared memory. When the disk proxy agent has received notifications from each of U1 and U2, file C is discarded from the shared memory (i.e. the memory space is marked as free for reuse). The benefit of this procedure is that file C has been read from disk storage only once, despite two utilities separately requiring read access.

In a second read-write scenario, U1 and U2 require write access to the same files as in the first scenario. As before, a single disk read retrieves file A and saves it to private memory for processing by U1. U1 performs its processing and file A is written back to disk. Similarly, a single disk read retrieves file D into private memory for processing by U2. U2 performs its processing operation and D is written back to disk. A single disk read retrieves file C into shared memory, which is written to by U1 and then U2 while the file is held in memory. A single disk write then returns the modified file C to disk storage. In this second scenario, one disk read and one disk write operation have been saved. A negotiation may be performed, using known techniques, to determine which of U1 and U2 should be the first to modify the in-memory copy of file C and using locks to avoid write-conflicts. The ordering of file processing could equally be random or a simple round-robin allocation.

In a third scenario, U1 requires write access whereas U2 requires only read access to file C. The situation is the same as for the second scenario except for the determination of which utility should perform its processing first (either read first or write first).

Although, as mentioned above, conventional solutions to resource contention can be applied to determine the order in which a plurality of utilities perform their operations on a file that is retrieved to shared memory, a number of specific rules can be implemented by the disk proxy agent which take account of the relationships between the utilities and the potential outcomes of their processing. A first example rule is that there is no need for other utilities to operate on a file for which an antivirus program identifies a matching virus signature. The antivirus program can be assigned a highest priority to ensure that it scans files before other utilities such as a backup program process the file. The disk proxy agent then cancels processing of the file by the other registered utilities.

Similarly, there is no need to operate on a spyware file identified by an anti-spyware program.

In addition to the exemplary embodiments described above, a number of alternative embodiments are within the scope of the present invention. For example, when there is not much free space in the shared memory, the file access manager may prioritise retrieval of files that the file access manager knows do not require content loading.

Another embodiment sets out to optimize CPU usage in addition to disk access. The solution is to rely on a single decompression of a compressed file such as a ZIP file and to run multiple read/write processes against the contents before compressing and writing back to disk. This can be implemented in association with the above-described scheduling solutions of the present invention.

Two embodiments described above load files into different areas of memory (private or shared) according to which utilities require access to the file. In one embodiment of the invention, the disk proxy agent loads all retrieved files into a shared-access area of memory. The disk proxy agent then sends a notification of the file's availability to only those utilities that require the file, as described above.

The embodiments described above implement asynchronous communications using queues. In another embodiment of the invention, the software components implementing the invention communicate synchronously—which can provide faster communications, but typically less assurance of communication success.

As noted above, the components shown in FIG. 1 could be distributed across more than one system. In particular, the utilities 60 may be running on a different machine from the disk proxy agent 50 and the utilities themselves may each be running on separate machines. For example, a GRID customer or client system in a Service Oriented Architecture could invoke the utilities as remote Web services. The performance impact incurred by the communication between the disk proxy agent and the utilities running over a network can be offset by the scalability, availability and reliability offered by the utilities being run on dedicated servers or 'server farms'. For example, a customer could pay one company to provide the indexing utility and another company for the antivirus service.

One embodiment of the invention provides special treatment for very large files, such as a virtual memory file, that could not be memory mapped in one go. Such files can be handled within the present invention by deferring them until the end of a normal scheduled execution of the disk proxy agent. At the end of a disk sweep, any files larger than a threshold size that have been deferred can then be presented to the utility that requires them. A message sent to the relevant utility is equivalent to the notification messages described above except that it specifies that the data is not in shared memory and that the application must perform its own disk access. This mechanism can be generally applied to handle any file which falls outside of the scope of normal processing.

The invention claimed is:

1. A computer-implemented method for scheduling read/write operations, comprising:

registering by a data processing apparatus with a file access manager by a set of computer processes by specifying file access requirements for each registered computer process, and by sending a registration message to the file access manager, the registration message specifying types of files required by the set of computer processes and a set of operations available for performing on the required files:

identifying by a data processing apparatus a plurality of computer processes that each independently require input/output (I/O) operations for a particular file held in first data storage, including examining the file access requirements of the registered computer processes;

responsive to the identifying, retrieving by a data processing apparatus the particular file from the first data storage into a second data storage wherein I/O operations to the first data storage are slower to complete than I/O operations to the second data storage;

responsive to retrieving, performing by a data processing apparatus a number N of the I/O operations on behalf of the plurality of computer processes on the retrieved file in the second data storage, wherein N is equal to or greater than 2; and responsive to the performing of I/O operations, saving by a data processing apparatus the retrieved file from the second data storage into the first data storage, wherein a number of required slower I/O operations to the first memory are reduced by an amount corresponding to the performed number N of I/O operations to the second memory.

2. A method according to claim 1, wherein the plurality of computer processes comprise automated batch processing of multiple files.

3. A method according to claim 2, wherein each of a batch of files is retrieved from the first data storage and is loaded into a shared area of the second data storage.

4. A method according to claim 3, further comprising:

the first plurality of computer processes serially performing I/O operations on the batch of files stored in the shared area; and in response to completion of the I/O operations, writing the batch of files to the first data storage if at least one write operation has been performed on the batch of files by the first plurality of processes, and then releasing the batch of files from the shared area of the the second data storage.

5. A method according to claim 1, wherein the identifying comprises identifying process requirements to execute periodically, and wherein the retrieving the particular file from data storage is scheduled to be performed at a time satisfying the periodic execution requirements.

6. A method according to claim 1, wherein the identifying a plurality of computer processes that each independently require storage I/O operations for a particular file comprises identifying concurrently pending I/O requests from the plurality of computer processes, which I/O requests are associated with read/write operations to be performed on the particular file.

7. A method according to claim 1, wherein the set of computer processes are distributed across a plurality of data processing systems and communicate with the file access manager via a communications network.

8. A method according to claim 1, wherein performing I/O operations on the retrieved file on behalf of the plurality of computer processes is dependent on the outcome of another computer process processing the retrieved file.

9. A method according to claim 8, wherein a backup process is prevented from performing a backup operation when a previously-performed antivirus scan identifies a match with a virus signature.

10. A file access manager computer program product recorded on a computer storage memory comprising:
   a computer storage memory suitable for encoding one or more computer program products; and
   one or more computer program products encoded by the computer storage memory causing a data processing apparatus to:
      register with a file access manager by a set of computer processes by specifying file access requirements for each registered computer process, and by sending a registration message to the file access manager, the registration message specifying types of files required by the set of computer processes and a set of operations available for performing on the required files;
      identify a plurality of computer processes that each independently require input/output (I/O) operations for a particular file held in first data storage, including examining the file access requirements of the registered computer processes;
      responsive to the identifying, retrieve the particular file from the first data storage into a second data storage wherein I/O operations to the first data storage are slower to complete than I/O operations to the second data storage;
      responsive to the retrieving, performing a number N of the I/O operations on behalf of the plurality of computer processes on the retrieved file in the second data storage, wherein N is equal to or greater than 2; and
      responsive to the performing of I/O operations, saving the retrieved file from the second data storage into the first data storage, wherein a number of required slower I/O operations to the first data storage are reduced by an amount corresponding to the performed number N of I/O operations to the second data storage memory.

* * * * *